US012640802B2

(12) United States Patent
Milroy et al.

(10) Patent No.: US 12,640,802 B2
(45) Date of Patent: May 26, 2026

(54) APPLICATION OF VICTS SUBARRAYS IN COHERENTLY-COMBINED LARGE ARRAY ANTENNA STRUCTURES

(71) Applicant: ThinKom Solutions, Inc., Hawthorne, CA (US)

(72) Inventors: William W. Milroy, Torrance, CA (US); Edward T. Kaszubski, Torrance, CA (US)

(73) Assignee: THINKOM SOLUTIONS, INC., Hawthorne, CA (US)

( * ) Notice: Subject to any disclaimer, the term of this patent is extended or adjusted under 35 U.S.C. 154(b) by 667 days.

(21) Appl. No.: 17/949,472

(22) Filed: Sep. 21, 2022

(65) Prior Publication Data

US 2023/0093195 A1      Mar. 23, 2023

Related U.S. Application Data

(60) Provisional application No. 63/246,431, filed on Sep. 21, 2021.

(51) Int. Cl.
*H04B 7/08* (2006.01)
*H01Q 1/12* (2006.01)
*H01Q 5/307* (2015.01)

(52) U.S. Cl.
CPC ......... *H04B 7/0885* (2013.01); *H01Q 1/1221* (2013.01); *H01Q 5/307* (2015.01)

(58) Field of Classification Search
CPC ............. H01Q 1/1221; H01Q 21/0025; H01Q 21/0031; H01Q 21/061; H01Q 3/08; H01Q 3/28; H01Q 3/32; H01Q 3/36; H01Q 5/307; H04B 7/0885
See application file for complete search history.

(56) References Cited

U.S. PATENT DOCUMENTS

| | | | |
|---|---|---|---|
| 6,919,854 B2 | 7/2005 | Milroy et al. | |
| 7,009,560 B1 * | 3/2006 | Lam ......................... | H01Q 3/36 |
| | | | 342/374 |
| 7,068,235 B2 | 6/2006 | Guidon et al. | |
| 7,205,948 B2 | 4/2007 | Krikorian et al. | |
| 10,819,022 B1 * | 10/2020 | Milroy ..................... | H01Q 5/55 |
| 2004/0090365 A1 * | 5/2004 | Newberg ................. | H01Q 3/22 |
| | | | 342/368 |

(Continued)

FOREIGN PATENT DOCUMENTS

| | | |
|---|---|---|
| EP | 3800734 A1 | 4/2021 |
| WO | WO2021/142374 A1 | 7/2021 |

OTHER PUBLICATIONS

Extended European Search Report dated Jan. 25, 2023 from related/corresponding European Patent Appl. No. 22196814.

(Continued)

*Primary Examiner* — Nguyen T Vo
(74) *Attorney, Agent, or Firm* — RENNER, OTTO, BOISSELLE & SKLAR, LLP

(57) ABSTRACT

A variable inclination continuous transverse stub (VICTS) antenna system includes a support structure, a plurality of VICTS antenna elements attached to the support structure, and a controller operatively coupled to the plurality of VICTS antenna elements, the controller configured to coherently combine signals through each of the plurality of VICTS antenna elements.

26 Claims, 9 Drawing Sheets

(56) References Cited

U.S. PATENT DOCUMENTS

| | | | |
|---|---|---|---|
| 2008/0005982 A1* | 1/2008 | Wang | H01Q 1/1221 |
| | | | 52/220.1 |
| 2016/0181700 A1* | 6/2016 | Milroy | H01Q 21/0031 |
| | | | 343/737 |
| 2018/0069321 A1* | 3/2018 | Milroy | H01Q 15/24 |

OTHER PUBLICATIONS

B. Li, et al, "Design of the Continuous Transverse Stub array," ISAPE2012, Xi'an, China, 2012, pp. 133-136, doi: 10.1109/ISAPE. 2012.6408726.
Yunxue Xu et al, "Continuous Transverse Stub (CTS) Array Antenna", Proceedings of ISA2012, Nagoya, Japan, pp. 1083-1086.
Mauro Ettorre et al, Continuous Transverse Stub Array for Ka-Band Applications:, (2015), pp. 1-8.

* cited by examiner

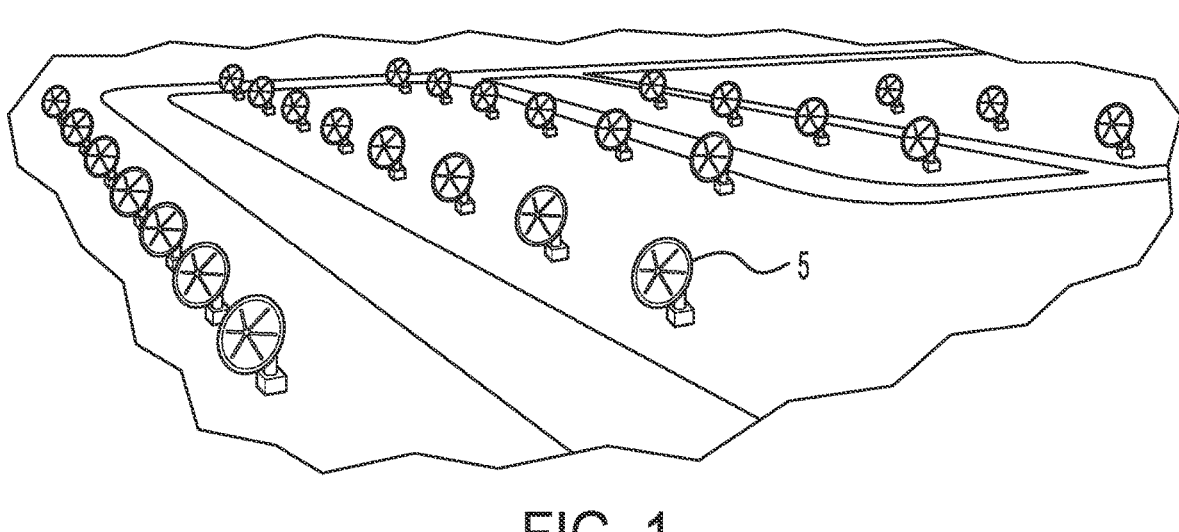
FIG. 1
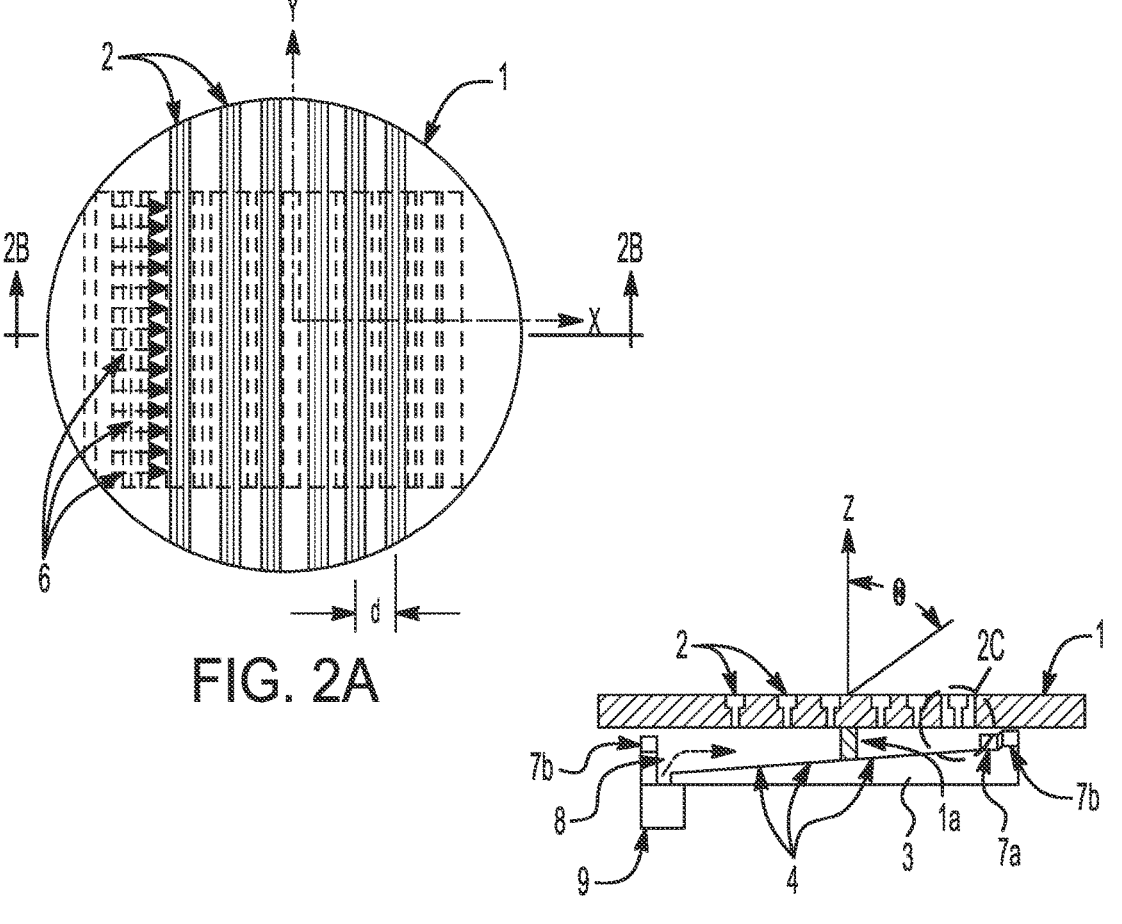
FIG. 2A
FIG. 2B

One Tracking 2.4 m Parabolic Dish

37-Element Phased Array (Equivalent to eight 2.4 Tracking Parabolic Dishes)

APPLICATION OF VICTS SUBARRAYS IN COHERENTLY-COMBINED LARGE ARRAY ANTENNA STRUCTURES

TECHNICAL FIELD

The present invention relates generally to antenna systems and, more particularly, to an array of coherently-combined variable inclination continuous transverse stub (VICTS) antenna structures.

BACKGROUND ART

Conventional satellite signal acquisition is the process of adjusting a ground receiver unit so that its antenna and receiver can receive and demodulate a signal from a satellite. This process usually involves electric motors and high-accuracy inclinometers, gyroscopes, and a magnetic compass. During the signal acquisition process, a receiver searches spatially until it can detect a satellite signal, then locks onto the signal and acquires the basic information about the satellite that is transmitting the signal. The receiver may then use this information to receive and decode additional information transmitted by that satellite.

In certain applications, mechanically-steerable parabolic dishes 5 are deployed as steerable antenna elements to form larger arrays, as illustrated in FIG. 1. A drawback to such parabolic dish arrays is that due to the relatively large size of each parabolic dish antenna, an array of such parabolic dishes requires a substantial parcel of land, which can be costly. Further, dishes can cost $1 Million or more and require heavy lifting equipment during installation (dishes can weigh 2,000+ lbs.). These dish systems also require a large positioning system (bearing, gear, & motor) that inherently has low reliability, is a single point failure, and requires frequent periodic maintenance. Another drawback to dish systems is that the number of beams and dish performance (size) is fixed at installation, i.e., there is no built-in flexibility to adapt to changing demands. Specifically, in those installations requiring multiple simultaneous independently steerable antenna beams, with each parabolic dish antenna fundamentally limited to supporting only one directive beam antenna, this then necessarily requires (N) multiple separate dishes in order to support (N) multiple independent beams.

SUMMARY OF INVENTION

In accordance with the present invention, a plurality of VICTS antenna elements are combined to form one or more steerable antenna elements. For example, nine VICTS antenna elements may form an antenna system, where the nine VICTS antenna elements can operate as a single phased array antenna or as multiple independently-steerable subarrays (e.g., three VICTS antenna elements may form a first steerable subarray, another three of the VICTS antenna elements may formed a second steerable subarray, and another three of the VICTS antenna elements may formed a third steerable subarray).

According to one aspect of the invention, a variable inclination continuous transverse stub (VICTS) antenna system includes: a support structure; at least two VICTS antenna elements attached to the support structure; and a controller operatively coupled to the at least two VICTS antenna elements, the controller configured to coherently combine signals received from each of the at least two VICTS antenna elements.

Optionally, the controller is operative to receive an analog signal from each of the at least two VICTS antenna elements, the controller configured to condition each of the received analog signals.

Optionally, the controller is configured to select a signal of interest from each signal received from the at least two VICTS elements, and apply a phase shift and true time delay (TTD) to the each of the selected signal of interest.

Optionally, the controller is configured to use an expected phase shift and an expected TTD based on an expected geometric configuration of the VICTS antenna system and on expected geometric characteristics of the selected received analog signal.

Optionally, the controller is configured to i) optimize the expected phase shift for each selected received signal by obtaining a phase difference between a reference signal and each selected received signal, and ii) and optimize the expected TTD for each selected signal by cross-correlating each selected received signal to find a time shift that aligns the selected received signals.

Optionally, the controller is configured to sum each of the selected, phase shifted and TTD signals to form a coherently-combined signal.

Optionally, a first subset of the at least two VICTS antenna elements form a first antenna group, and a second subset of the at least two VICTS antenna elements form a second antenna group, wherein the controller is operative to communicate over a first frequency band using the first antenna group, and to communicate over a second frequency band using the second antenna group.

Optionally, the first frequency band is the X-band and the second frequency band is the S-band.

Optionally, the controller is operative to electronically steer the at least two VICTS antenna elements.

Optionally, the support structure comprises a flat surface.

Optionally, the support structure comprises a roof or external wall of a building.

Optionally, the support structure comprises a hemispherical shape.

Optionally, the controller comprises at least one of a receive antenna controller or a transmit antenna controller.

Optionally, the controller comprises a receive antenna controller and a receive antenna beam former communicatively coupled to the receive antenna controller, the receive antenna beam former communicatively coupled to each of the at least two VICTS antenna elements.

Optionally, the antenna system includes at least two phase shifting elements, wherein a respective one of the at least two phase shifting elements is communicatively arranged between the receive antenna beam former and a respective one of the at least two VICTS antenna elements, each of the plurality of phase shifting elements communicatively coupled to the receive antenna controller.

Optionally, the beam former comprises both radio frequency (RF) and digital elements.

According to another aspect of the invention, a method for obtaining a radio frequency (RF) signal using a variable inclination continuous transverse stub (VICTS) antenna system that includes at least two VICTS antenna elements attached to a support structure includes: receiving an analog signal from each of the at least two VICTS elements; and coherently combining each of the received analog signals.

Optionally, the method includes conditioning each of the received analog signals.

Optionally, conditioning includes at least one of amplifying, filtering, power limiting, and attenuating.

Optionally, the method further includes selecting a signal of interest from each analog signal received from the at least two VICTS elements, and applying a phase shift and true time delay (TTD) to each of the selected signals.

Optionally, applying the phase shift and TTD includes using an initial phase shift and an initial TTD based on an expected geometric configuration of the VICTS antenna system and on expected geometric characteristics of the selected received analog signal.

Optionally, the method includes optimizing the expected phase shift for each selected received signal by obtaining a phase difference between a reference signal and each selected received signal, and optimizing the expected TTD for each selected received signal by cross-correlating each selected received signal to find a time shift that aligns the selected received signals.

Optionally, the method includes summing each of the selected, phase shifted and TTD signals to form the coherently-combined signal, and communicating the coherently-combined signal to an end point.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

FIG. 1 illustrates a conventional parabolic dish antenna system.

FIG. 2A is a top view of a portion of an exemplary embodiment of a VICTS that may be used in the antenna array in accordance with the invention.

FIG. 2B is a simplified cross-sectional view taken along line 2B-2B of FIG. 2A.

4

Figure 9:
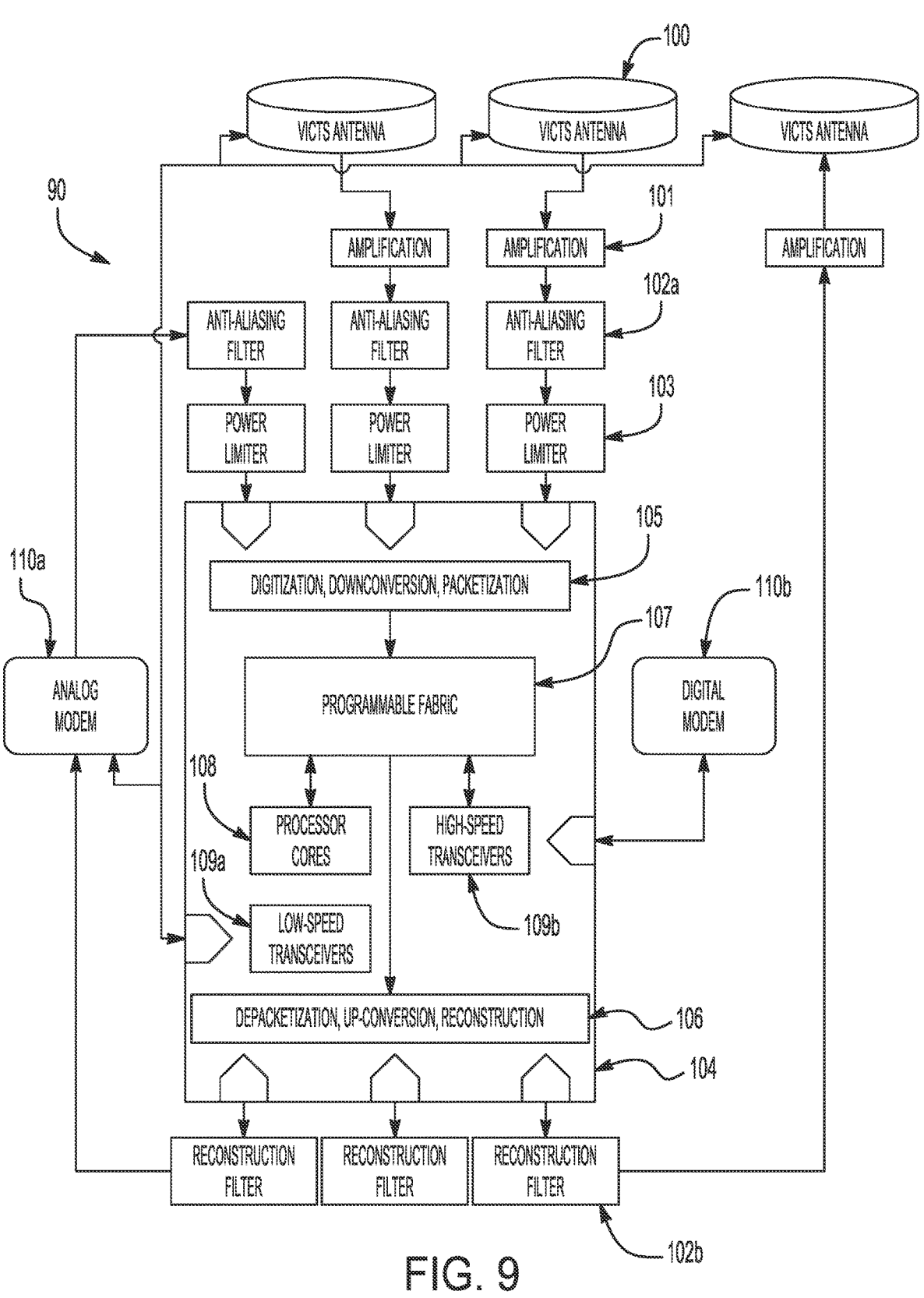
Figure 10:
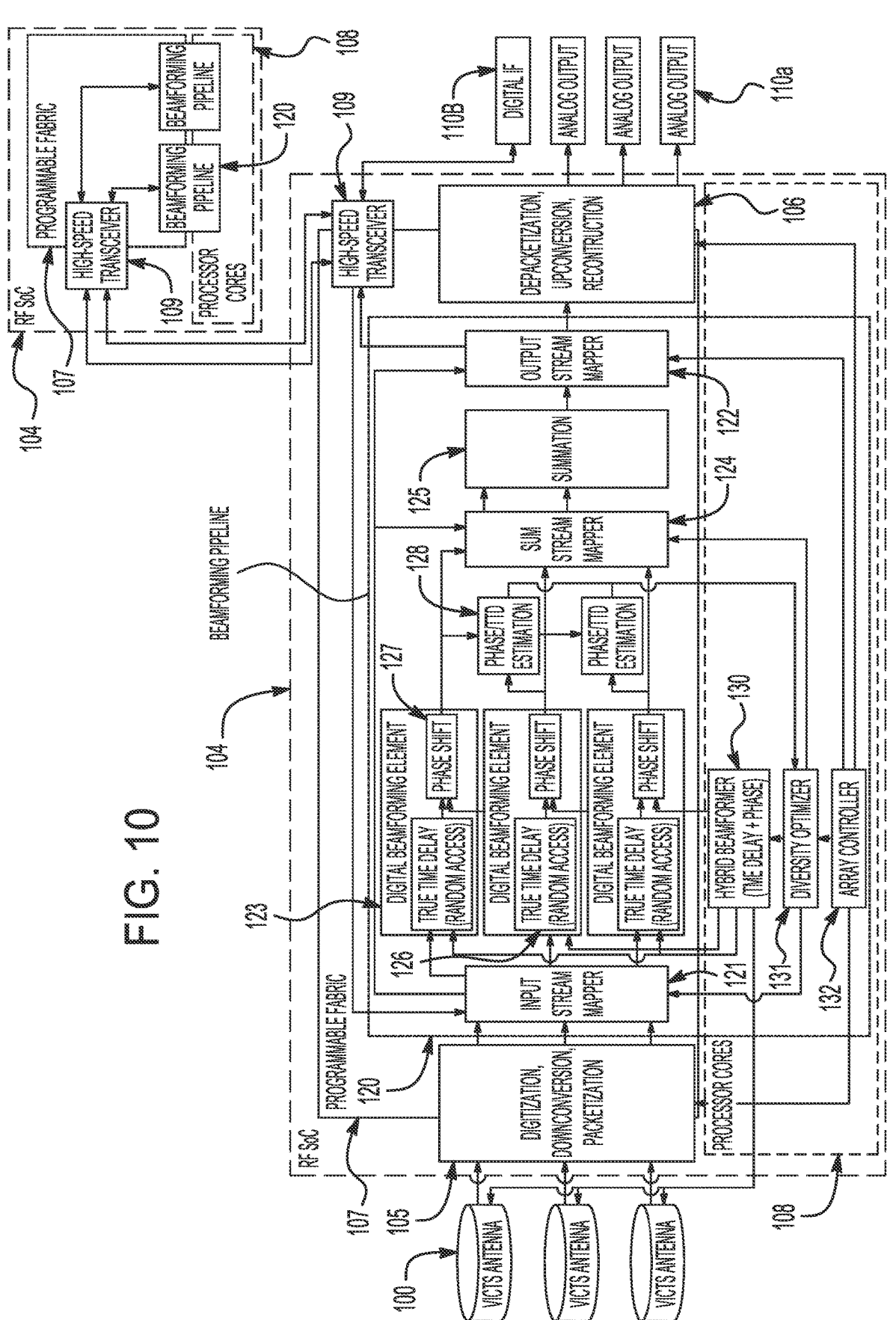

FIG. 9 is a simplified block diagram of the analog and digital components of an exemplary single beamforming device (processing node,) including the logical connections between these components FIG. 10 is a high-level block diagram of a beamforming pipeline that can be implemented in the beamforming device of FIG. 9, including conceptual views of the resource utilization and distributed beamforming pipeline.

Figure 11:
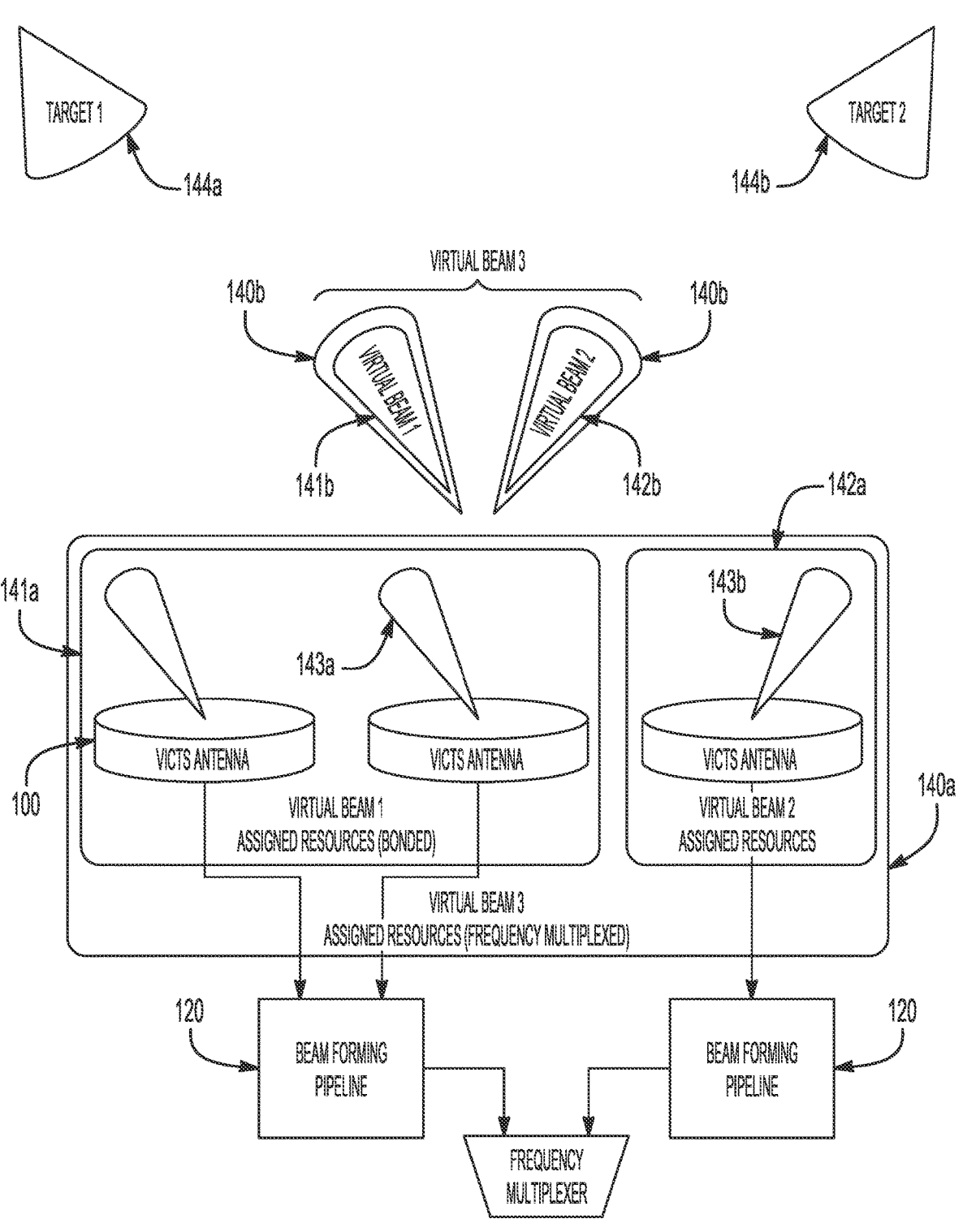

FIG. 11 is a conceptual view of a set of physical and virtual antenna resources, including the relevant hierarchy and associated beamforming network.

Figure 12:
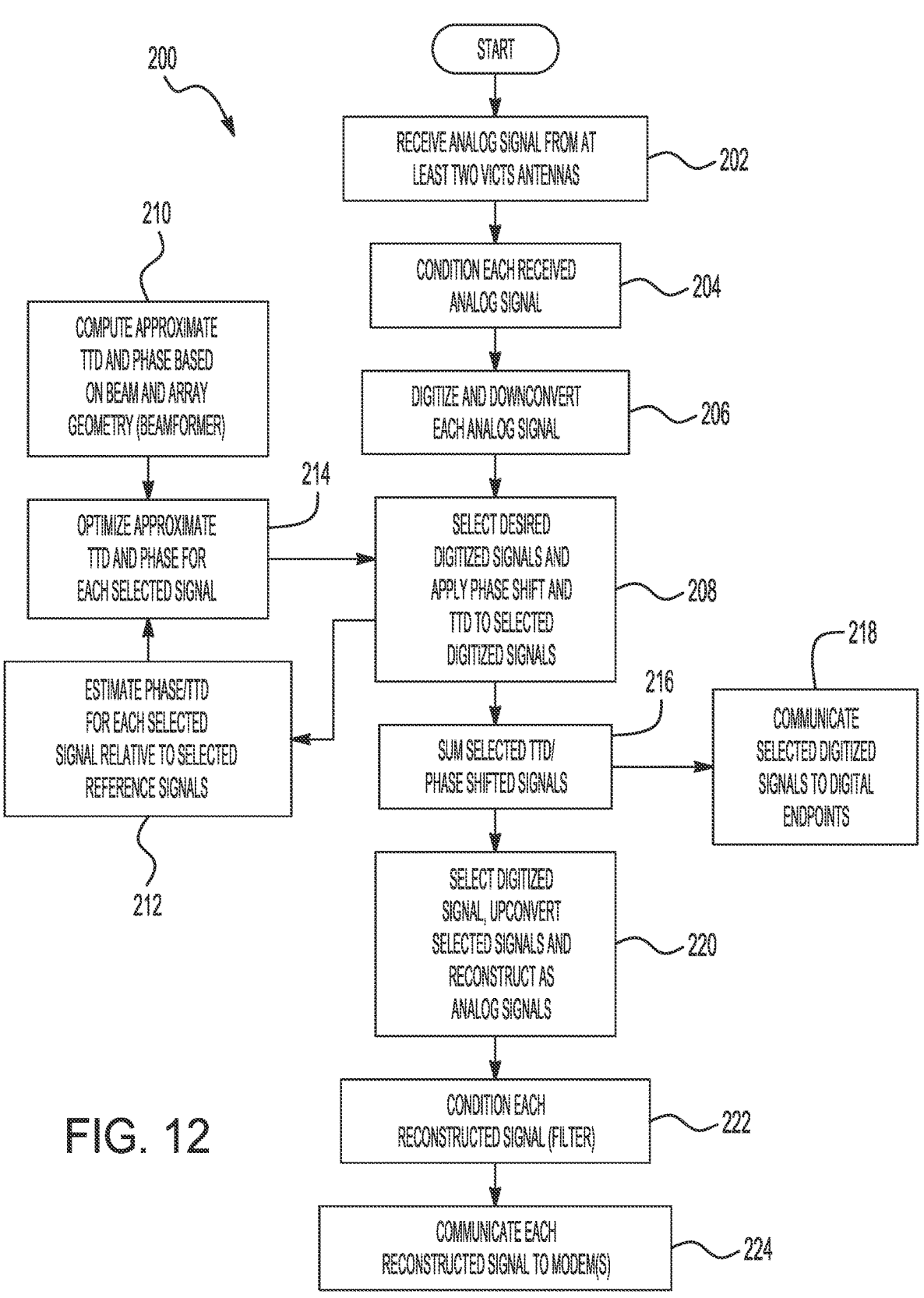

FIG. 12 is a flow chart illustrating steps of an exemplary method for coherently combining a plurality of VICTS antennas in accordance with an embodiment of the invention.

DETAILED DESCRIPTION OF INVENTION

Embodiments of the present invention will now be described with reference to the drawings, wherein like reference numerals are used to refer to like elements throughout. It will be understood that the figures are not necessarily to scale. Additionally, it is noted that the terms "antenna" and "aperture" may be used interchangeably.

The present invention is directed to an antenna array that utilizes a plurality of variable inclination continuous transverse stub (VICTS) antenna elements coherently-combined together, in a flexible reconfigurable manner, in order to provide a multi-element multi-beam phased-array comprised of the steerable VICTS antenna elements. As used herein, to coherently combine refers to combining several separate high-power radio frequency (RF) beams so as to obtain either a single or a multiple collection of more highly focused beam(s) of correspondingly higher gain and directional sensitivity.

The VICTS array in accordance with the present invention requires significantly less space than required by a conventional parabolic dish antenna system. VICTS antenna elements are well known in the art and therefore are not be described in detail herein. An exemplary VICTS antenna element that may be used in accordance with the present invention is briefly described below. Further information concerning VICTS antenna elements may be found, for example, in U.S. Pat. Nos. 6,919,854 and 7,205,948, the contents of which are hereby incorporated by reference.

A VICTS antenna element includes two plates, one (upper) comprising a one-dimensional lattice of continuous radiating stubs and the second (lower) comprising one or more line sources emanating into the parallel-plate region formed and bounded between the upper and lower plates. Mechanical rotation of the upper plate relative to the lower plate serves to vary the inclination of incident parallel-plate modes, launched at the line source(s), relative to the continuous transverse stubs in the upper plate, and in doing so constructively excites a radiated planar phase-front whose angle relative to the mechanical normal of the array (theta) is a simple continuous function of the relative angle (ψ) of (differential) mechanical rotation between the two plates. Common rotation of the two plates in unison moves the phase-front in the orthogonal azimuth (phi) direction. A VICTS antenna element can provide dramatically reduced component, assembly, and test costs (in one exemplary simple form, there are only three integrated passive RF components of the VICTS, a radiating CTS plate, a lower base plate and a dielectric support, with no phase-shifters, T/R modules, or associated control/power distribution). A VICTS antenna element also can provide reduced prime power and cooling requirements (no phase shifters or T/R modules in an exemplary embodiment), and improved instantaneous bandwidth (the primary scan mechanism of the VICTS is a "true-time-delay" optical phenomena). Further, extreme composite scan angles are achieved while maintaining moderate scan angles and well-behaved scan impedances in each of the cardinal planes).

Figures 2C, 3A, 3B:
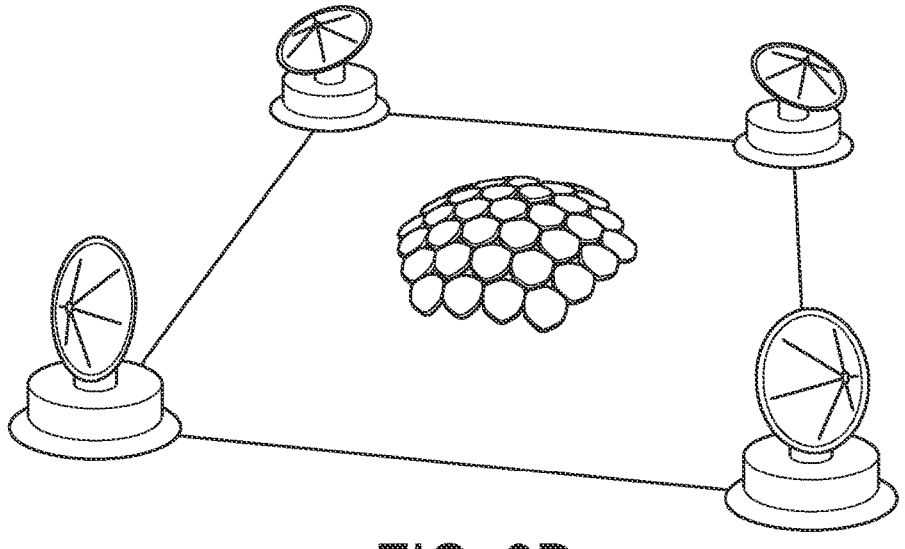
FIG. 2C is an enlargement of a portion of the embodiment illustrated in FIG. 2A
FIG. 3A illustrates an exemplary VICTS antenna array formed from a plurality of VICTS antenna elements in accordance with the invention.
FIG. 3B illustrates the footprint of an exemplary VICTS antenna array according to the invention relative to the footprint of a conventional parabolic antenna system.

An exemplary VICTS antenna element array is illustrated in FIGS. 2A-2C in a rectangular X, Y, Z coordinate frame of reference. FIG. 2A is a top view of a conductive upper plate 1 and a lower conductive plate 3 (FIG. 2B), shown disposed in a plane parallel to the X-Y plane. The upper plate 1 contains a set of identical, equally spaced, Continuous Transverse Stub (CTS) radiators 2. Note that a total of six (6) stubs are shown as an example, although upper plates 1 containing more stubs, or less stubs may alternatively be deployed.

FIG. 2B is a cross-sectional view taken along line 2B-2B of FIG. 2A, showing in cross-section the upper plate 1 and lower conductive plate 3. FIG. 2C is an enlarged view of a portion of FIG. 2B. The lower conductive plate 3 is made in such a way that its cross-section varies in height in the positive z-direction as a function of x-coordinate as shown. Both plates are located in X, Y, Z space in such a way that they are centered about the z-axis. An optional dielectric support 1a is disposed along the z-axis and acts as a support between the upper and lower plates.

The top surface of the lower plate 3 contains a number of rectangular shaped corrugations 4 with variable height 5a, width 5b, and centerline-to-centerline spacing 5c. As shown in FIG. 2C in this exemplary embodiment, the corrugations 4 are disposed with constant cross-section over the full length of the lower plate 3 in the y-direction.

The lower surface of plate 1 and the upper corrugated surface of plate 3 form a quasi-parallel plate transmission line structure that possesses plate separation that varies with x-coordinate. The transmission line structure is therefore periodically loaded with multiple impedance stage CTS radiating stubs 2 that are contained in plate 1. Further, plate 1 along with the upper surface of plate 3 form a series-fed CTS radiating array, with novel features, including that the parallel plate spacing varies in one dimension and corrugations are employed to create an artificial dielectric or slow-wave structure.

The CTS array may be excited from below at one end 8 by a generic linear source 9. Traveling-waves consisting of parallel-plate modes are created by the source between the lower surface of the upper plate and the upper surface of the lower plate. These modes propagate in the positive x-direction. Plane wave-fronts associated with these modes are contained in planes parallel to the Y-Z plane. Dotted arrows, 6, indicate the direction of rays associated with these modes in a direction perpendicular to the Y-Z plane.

As the traveling-waves propagate in the positive x-direction away from the linear source 9, corresponding longitudinal surface currents flow on the lower surface of the upper plate and the upper surface of the lower plate and corrugations in the positive x-direction. The currents flowing in the upper plate are periodically interrupted by the presence of the stub elements. As such, separate traveling waves are coupled into each stub that travel in the positive z-direction to the top surface of the upper plate and radiate into free space at the terminus of the uppermost impedance stage.

The collective energy radiated from all the stub elements causes an antenna pattern to be formed far away from the upper surface of the upper plate. The antenna pattern will show regions of constructive and destructive interference or sidelobes and a main beam of the collective waves and is dependent upon the frequency of excitation of the waves and geometry the CTS array. The radiated signal will possess linear polarization with a very high level of purity. The stub centerline to centerline spacing, d, and corrugation dimensions 5a, 5b, and 5c (FIG. 2C), may be selected such that the main beam is shifted slightly with respect to the mechanical boresight of the antenna defined by the z-axis.

Any energy not radiated into free space will dissipate in an RF energy-absorbing load 7a placed after the final stub in the positive x-direction. Unique non-contacting frictionless RF chokes, 7b, placed before the generic linear source (negative x-direction) and after the RF energy-absorbing load (positive x-direction) prevent unwanted spurious radiation of RF energy.

If the upper plate 1 is rotated or inclined in a plane parallel to the X-Y plane by some angle ψ, the effect of such a rotation is that the orientation of the stubs relative to the fixed incident waves emanating from the source is modified. As the waves travel away from the source towards the stubs, rays incident upon the stubs towards the top, (positive y-coordinate) of the parallel plate region arrive later in time than rays incident towards the bottom of the parallel plate region (negative y-coordinate). Consequently, waves coupled from the parallel plate region to the stubs will possess a linear progressive phase factor along their length parallel to Y' and a smaller linear progressive phase factor perpendicular to their length along the X' axis. These two linear phase factors cause the radiated planar phase front from the antenna to make an angle with the mechanical boresight (along the z-axis) of the antenna that is dependent on Y. This leads to an antenna pattern whose main beam is shifted or scanned in space.

The amount of change in the linear progressive phase factors and correspondingly the amount of scan increases with increasing ψ. Further, both plates 1 and 3 may be rotated simultaneously to scan the antenna beam in azimuth. Overall, the antenna beam may be scanned in elevation angle, θ, from zero to ninety degrees and in azimuth angle, φ, from zero to three hundred and sixty degrees through the differential and common rotation of plates 1 and 3 respectively. Moreover, the antenna beam may be continuously scanned in azimuth in a repeating three hundred and sixty-degree cycle through the continuous rotation of plates 1 and 3 simultaneously.

A VICTS antenna element provides a relatively thin, two dimensionally scanned phased array antenna. This is accomplished through a unique variable phase feeding system whose incident phase fronts are fixed while scanning is achieved by mechanically inclining (rotating) a set of CTS stubs.

Referring now to FIG. 3A, illustrated is an exemplary antenna array 10 in accordance with the invention. The antenna array 10 is formed from a plurality of VICTS antenna elements 12, where the VICTS antenna elements 12 are tightly packed together in order to minimize both the overall footprint as well as the area of the physical margins between the elements comprising the antenna array 10. Preferably, the spacing between adjacent VICTS antenna elements is as close as practical, e.g., 1 inch or less. The relatively small VICTS antenna elements 12 enable the VICTS antenna array 10 to be designed to conform to various surfaces. For example, in the illustrated embodiment of FIG. 3A the VICTS antenna elements 12 are arranged to approximate a curved surface and, thus, could be placed on a dome-type roof structure or other curved structure. Alternatively, the VICTS elements 12 could be arranged to define a flat surface that may be placed on an outer wall or roof of a building. As will be appreciated, other configurations of the VICTS elements 12 are possible depending on the underlying structure to which the VICTS elements 12 are attached.

A VICTS antenna array 10 in accordance with the invention, when compared to gimballed parabolic dishes, is compact (and depending on the configuration of the VICTS antenna elements 12 they can be planar or generally planar), obviating any shadowing or blockage issues. This is advantageous over parabolic dishes, which are relatively large in size and thus if placed close together have significant shadowing and blockage issues (i.e., one dish may block the field of view of another adjacent dish). To mitigate shadowing and blockage when parabolic dishes are arrayed together, each dish is spaced far apart from an adjacent dish (typically 15 meter minimum spacing between adjacent dishes). The spacing requirements to prevent blockage for multiple parabolic dishes is illustrated in FIG. 3B. In contrast to the spacing requirements for an array of parabolic dishes, the VICTS antenna array 10 in accordance with the invention requires less than 20% of the space of an equivalent dish system, which also can be seen in FIG. 3B.

Compared to electronically-steerable arrays (ESAs), VICTS Arrays consume $\frac{1}{10}^{th}$ the prime power and are 70% to 90% less expensive. Also, the VICTS Array is typically three times to eight times more efficient in terms of area required to meet a given receive sensitivity requirement, which uniquely enables VICTS-based multi-subarray solutions to be significantly more compact with phase-centers that are considerably more densely situated. This reduces overall time-delay between adjacent subarray elements, therefore greatly reducing coherent combining complexity.

Further, the VICTS antenna array 10 in accordance with the invention provides fixed phase-centers, defined as the precise physical location within the boundary of the antenna from which RF energy is effectively focused and collected, as the VICTS antenna array 10 itself does not physically translate nor tilt (only rotates about a fixed axis) as it's antenna beam scans. This is in contrast to the "moving" phase-centers associated with dish implementations, with separate tilting and translating gimbal axes, serving to move the physical phase-center of each dish antenna, thereby complicating and limiting the overall accuracy of coherent RF combining of the individual antennas (dishes). In addition, the VICTS array formed from individual VICTS elements 12 (owing to the compact and kinematically simple nature of VICTS elements) provide for superior beam agility (speed) as compared to dishes, thereby enabling "fast" beam-to-beam switching between individual satellites, whereas parabolic dish-based implementations are necessarily slow and "non-agile."

Figure 4:
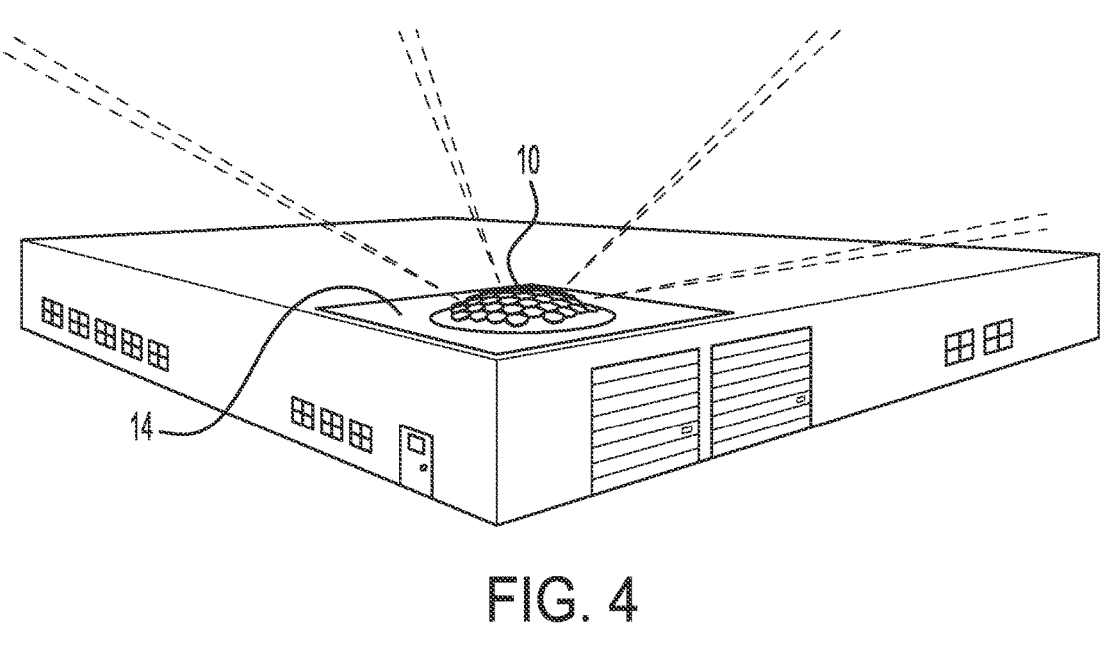
FIG. 4 illustrates an installation of a VICTS antenna array of FIG. 3A on a roof of a building.

Due to the relatively small form factor of the VICTS elements, the antenna array 10 can be placed on roof structures 14 as shown in FIG. 4, or can be arranged on the ground. In some embodiments, the antenna array 10 includes a sub-structure, such as a metal, concrete or composite frame structure (not shown), that maintains the spatial arrangement of the VICTS antenna elements 12 relative to each other. The VICTS antenna elements can be tightly packed to minimize the overall footprint of the array and, in curved profile applications, can provide additional low elevation angle scanning capability.

In the embodiment illustrated in FIGS. 3A-4 the substructure, which can elevate the VICTS elements off the ground for cable routing and maintenance access, defines an antenna array 10 having a hemispherical shape. It should be appreciated, however, that other configurations are possible. For example, the plurality of VICTS antenna elements 12 may be arranged on a flat surface, such as on an exterior wall or roof of a building. In other words, the antenna array 10 in accordance with the invention can be contoured to match a surface that supports the antenna array.

Figure 5:
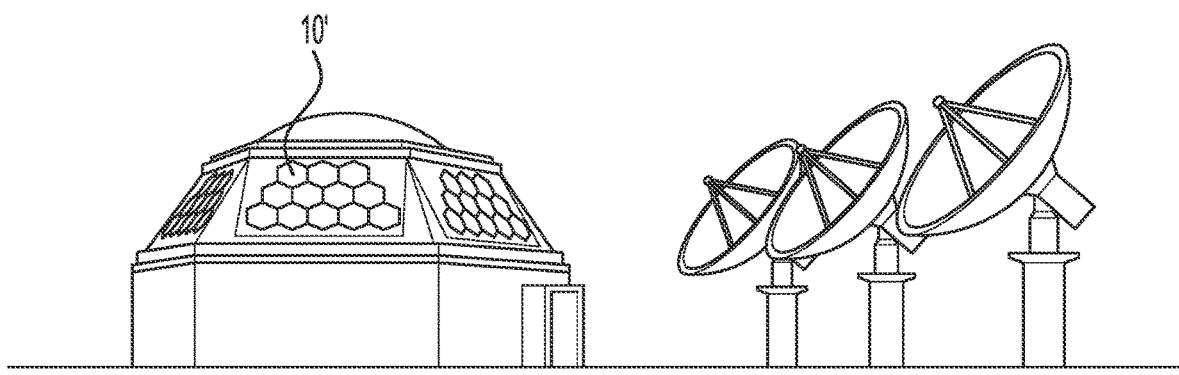
FIG. 5 illustrates an installation of a VICTS antenna array of FIG. 3A on an outer wall of a building.

With reference to FIG. 5, an antenna array 10' may be formed on each wall of a hexagonal structure. The embodiment of FIG. 5 can (for example) provide the equivalent performance to multiple 3.7 meter dish antennas supporting three or more simultaneous satellite beams/tracks, while supporting up to two tracks at 5 meter dish equivalent performance.

The VICTS antenna array 10 in accordance with the invention provides X-band Rx operation with dual CP polarization, and supports Earth Exploration Satellite Service (EESS) band (8025-8400 MHz). In this mode of operation, thirty-four VICTS antenna elements each being a 1 meter active diameter element provides 34 decibels per degree Kelvin (dB/K) Peak Broadside G/T, which is defined as the power ratio of the Antenna Gain to the Effective Noise Temperature for the combined elements. Further, the VICTS antenna array 10 provides S-band Tx operation with dual CP polarization. For example, three 1 meter active diameter (defined as the subset of the larger physical diameter from which RF radiation "actively" emanates) VICTS elements can each support Transmit signal levels exceeding 40 decibel watts (dBW) equivalent isotropically radiated power (EIRP) at 5 degrees Elevation (each VICTS Element).

The VICTS antenna array 10 is relatively simple to install. Each VICTS antenna element 12 weighs approximately 55 pounds and thus can be easily moved without requiring special equipment. Further, a modular mounting structure allows for rapid construction of the antenna array 10. In the unlikely event one VICTS module fails or otherwise requires replacement, the problematic VICTS module 12 can be removed and replaced with a new module, without shutting down the system (i.e., the VICTS modules are hot swappable and thus there is no system downtime).

In addition to its relatively small footprint, another advantage of the VICTS antenna array 10 in accordance with the invention is that it can provide Dynamic Multi-Beam Capability. More specifically, the Beam Count, Beam Position, Polarization, and Equivalent Dish Size can be reconfigured on demand, via user-defined and software-controlled partitioning of the antenna into one or more independently pointed/directed antenna beams through appropriate revision of the groupings of the VICTS antenna elements 12. This is accomplished via selective user-defined and software-controlled partitioning/grouping of individual antenna elements 12. Further, the system is easily expandable by simply adding more VICTS antenna elements 12 (e.g., the VICTS antenna elements 12 can be mixed and matched to meet changing demands). Further, the VICTS antenna array 10 provides high beam agility and independently-steerable beam equivalents (at 5 degree elevation) (e.g., 3×4.0 meter equivalent, 4×3.6 meter equivalent, and 8×2.4 meter equivalent.)

Figure 6:
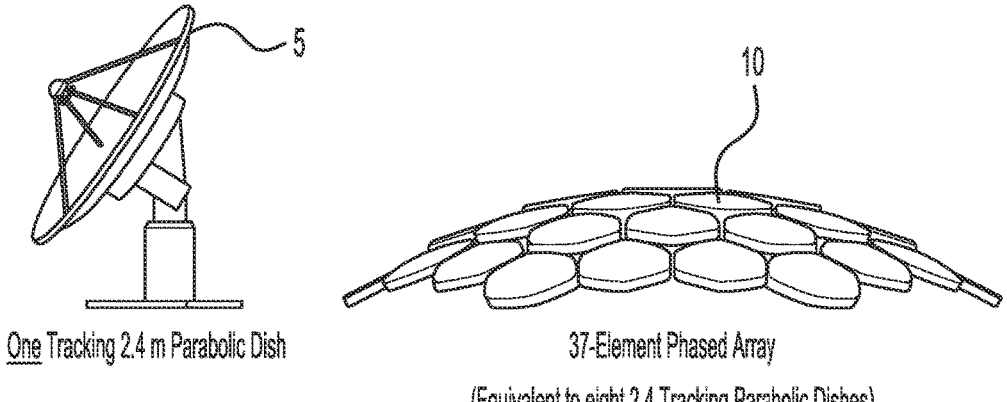
FIG. 6 is a comparison of a VICTS antenna array in accordance with the invention and a single parabolic dish antenna.

The VICTS antenna array 10 in accordance with the invention has a significantly lower profile compared to parabolic dish systems. For example, and with reference to FIG. 6, one thirty-seven element VICTS antenna array 10 in accordance with the invention is equivalent to eight 2.4 meter tracking parabolic dishes. Moreover, the height of the VICTS antenna array 10 in accordance with the invention is significantly less than an equivalent-performing parabolic dish antenna. The low-profile form-factor of the antenna array 10 significantly reduces wind-loading and visual signature.

The VICTS antenna array 10 in accordance with the invention has a number of advantages over conventional parabolic dish systems. For example, there are an infinite number of software-definable combinations that can be configured. The following configurations are focused on a 'targeted' minimum 5° elevation angle.

Figure 7:
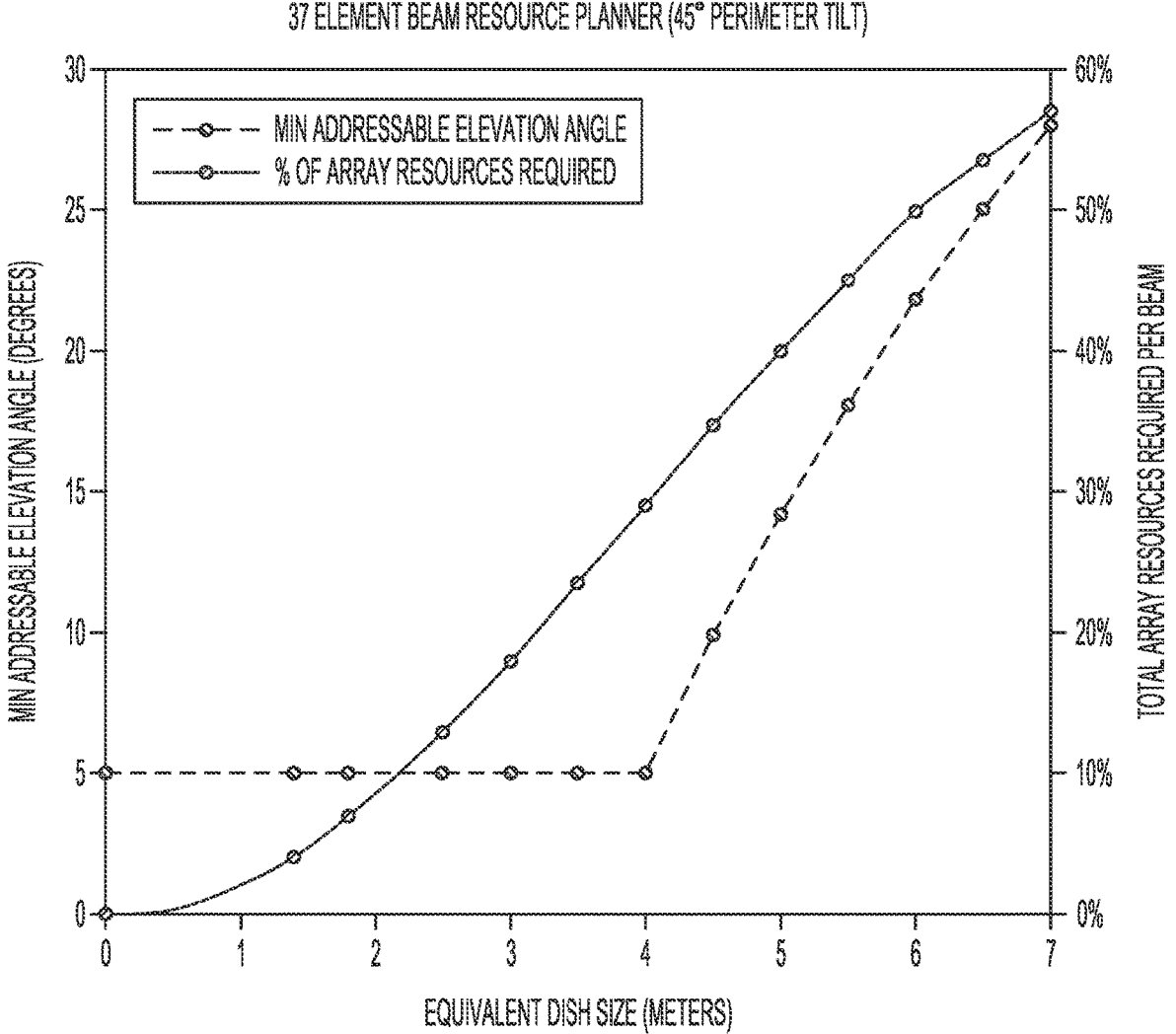
FIG. 7 is a graph showing minimum addressable elevation angle and total array resources required per beam vs. dish size.

Qty 1×7.0 meter at 28 degrees Elevation+quantity 2×3.5 meter at 5 degrees Elevation Qty 2×6.0 meter at 22 degrees Elevation Qty 2×5.4 meter at 17 degrees Elevation Qty 3×4.0 meter at 5 degrees Elevation Qty 4×3.6 meter at 5 degrees Elevation Qty 8×2.4 meter at 5 degrees Elevation FIG. 7 illustrates the minimum elevation angle for the equivalent-performing dish size in meters for a VICTS antenna array 10 according to the invention.

Figure 8:
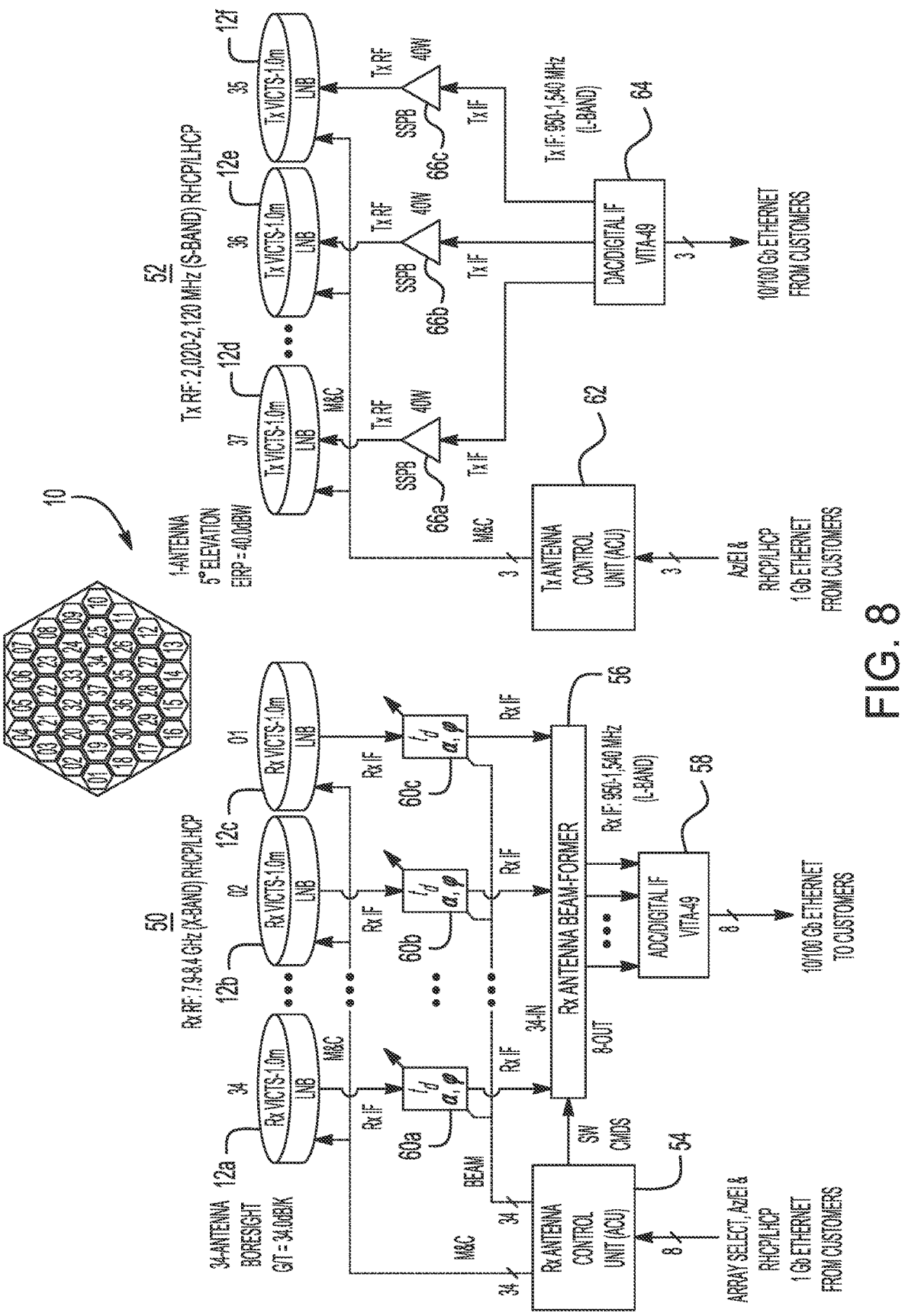
FIG. 8 is a functional phased array block diagram for a VICTS antenna array in accordance with the invention, utilizing analog beamforming techniques.

Referring to FIG. 8, illustrated is a phased-array functional block diagram for a VICTS antenna array system in accordance with the invention, employing analog beamforming techniques. In particular, FIG. 8 illustrates the multi-mode capabilities of the VICTS Antenna array 10 in accordance with the invention. For sake of clarity only six VICTS antenna elements 12 are shown. It should be appreciated, however, that the number of VICTS antenna elements 12 can vary based on the needs of the specific application.

The antenna array 10 includes a first antenna group 50 formed by VICTS Receive antenna elements 12a, 12b and 12c, and a second antenna group 52 formed by VICTS Transmit antenna elements 12d, 12e and 12f, where the first and second groups 50, 52 are mounted on the same support structure (e.g., the same building wall or roof, or the same support structure). The first antenna group 50 corresponds to an X-band RHCP/LHCP Receive antenna system, while the second antenna group 52 corresponds to an S-band RHCP/LHCP Transmit antenna system.

Each VICTS antenna element 12a, 12b, 12c of the first antenna group 50 is communicatively coupled to and controlled (in individual beam pointing position, and operating frequency) by a receive antenna control unit 54, which in turn is communicatively couplable to a network, such as a customer's network (not shown). Additionally, each VICTS antenna element 12a, 12b, 12c of the first antenna group 50 is communicatively coupled to a receive antenna beam former 56, which in turn is communicatively coupled to an analog-to-digital converter 58 that is couplable to the network. The receive antenna beam formed 56 is also communicatively coupled to the antenna control unit 54. Between each VICTS antenna element 12a, 12b, 12c and the receive antenna beam former 56 is a respective integrated phase shifter+variable attenuator+variable time-delay device, 60a, 60b, 60c, the phase shifters each communicatively coupled to the receive antenna control unit 54. The receive antenna control unit 54 is operative to control each integrated phase and time-delay control device (one per VICTS array), the pointing of each VICTS array (azimuth and elevation), and the antenna beam former 56 to steer the VICTS antenna elements 12a, 12b, 12c as needed in order to receive data over the X-band. Individual time-delay values (for each individual VICTS array) are computed and commanded based on the known geometric direction (elevation and azimuth) to the satellite together with the known relative positions (x,y,z) of the phase-centers of each of the individual VICTS arrays, in order to (coarsely) correct for the relative time delay differences, as the incoming plane-wave signal progressively and sequentially impinges on (is received by) the individual phase-centers of each individual VICTS array (closest to the satellite first, furthest from the satellite last.) As compared to "phase-only" combining, the use of variable time-delay ("time-delay combining") uniquely enables efficient combining of wide instantaneous frequency signals (wide "channel bandwidths" in the frequency-domain, corresponding to narrow "pulses" in the time-domain) which would otherwise be distorted and dispersed (inefficiently combined) in a phase-only embodiment. The individual phase-shifter devices (60a, 60b, 60c) are then used to (precisely) trim the phase (the residual time-delay) in order to fully-optimize the coherent combining of the ensemble of antennas, thereby compensating for (calibrating out) both static and dynamic variations due to small non-uniformities in individual cable lengths, uncertainty of individual antenna physical positions, temperature and wind effects, etc. Finally, individual attenuator devices in each integrated device (60a, 60b, 60c) are used to trim/equalize the individual intermediate frequency (IF) signals from each VICTS array, compensating for interconnecting cable path loss and LNB gain differences.

Moving to the second antenna group 52, each VICTS antenna element 12d, 12e, 12f of the second antenna group 52 is communicatively coupled to a transmit antenna control unit 62 (which commands and controls each of the individual VICTS arrays to point and track in the desired elevation and azimuth directions) which in turn is communicatively couplable to a network (not shown) for control and monitoring purposes. Each individual VICTS antenna element 12d, 12e, 12f is also communicatively coupled to a digital-to-analog converter 64 through respective high power block up-converter (BUC) amplifiers 66a, 66b, 66c. Data from the network, under the control of the transmit antenna control unit 62, is transmitted as individual signals, to each of the individual VICTS arrays in the second antenna group 52 over the appropriate S-band transmit frequency.

The VICTS antenna array 10 in accordance with the invention can have various connection options. For example, modems can be used to connect to the receive beam former 56. Alternatively or additionally, each beam former can accept one or more analog modem connections and one or more digital modem connections. Each receive beam former 56 can communicate within a mesh network, can pass digitized signals to any other beam former, and can digitally combine beams from any other beam former. This provides a flexible, scaleable, redundant network of beams and modems that can create up to multiple individual beams (each of 26 dB/K strength, for example) that can be seamlessly combined or handed off between arrays.

A digital beamforming pipeline is employed in order to achieve adaptive, high-bandwidth beamforming and diversity optimization of multiple VICTS antennas in a wide variety of bands and array baselines, both static and dynamic, up to tens of meters. With reference to FIG. 9, an exemplary beamforming node 90 contains computational and processing resources 104 configured to implement the beamforming pipeline. The computational and processing resources 104 include programmable fabric 107 (discussed in further detail below) communicatively coupled to digitizers 105 to receive data therefrom. Further, the programmable fabric 107 is communicatively coupled to i) processor cores 108 that execute logic instructions, ii) low-speed and high-speed transceivers 109a, 109b operative to transmit and receive data to/from the programmable fabric 107 via the antennas 100, and iii) depacketization, up conversion and reconstruction circuitry 106. The high-speed transceivers 109*b* are operative to link the programmable fabric 107 to other digital endpoints (digital modems or other beamforming nodes), and are decoupled from the antennas 100 themselves. The low-speed transceivers 109*a* are operative to send commands to the antennas 100, but the processor cores 108, not the programmable fabric 107, are the other endpoint in that process. The computation and processing resources 104 receive signals from the respective VICTS antennas 100 through analog signal conditioning components including amplification circuits 101, anti-aliasing filters 102*a*, and power limiting devices 103, which are used to bring the signal near the full-scale range of the digitizer, attenuate the aliasing of unwanted out-of-band noise, and protect the RF front-end of the digitizers, respectively. Where possible, the analog signals from the VICTS antennas 100 are digitized directly at RF frequencies <6 GHz; otherwise, a block downconverter can be employed to lower the band of interest to a suitable IF frequency so that it can be digitized. The beamforming node 90 additionally provides outputs for analog endpoints via analog modem 110*a* (which receives signals from low-speed transceiver 109*a* and reconstruction filter 102*b*) and digital endpoints via digital modem 110*b* (which receives signals from high-speed transceiver 109*b*). Note the digital modem 110*b* is decoupled from the analog circuitry and communicates with the programmable fabric 107 via the high-speed transceiver 109*b*. The up conversion and reconstruction circuitry 106 is communicatively coupled to reconstruction filters 102*b* to provide signals to the analog modem 110*a*. The output of the analog modem 110*a* is fed back into one of the antialiasing filters 102*a*, while the output of the digital modem 110*b* is provided to one of the VICTS antennas 100 through amplifier 110 for transmission to a receiving device (not shown). It should be appreciated that other analog devices (not shown) may be connected to the processing resources 104 via additional reconstruction filters 102*b* (e.g., via the middle reconstruction filter 102*b* in FIG. 9).

A fundamental objective of the beamforming node 90 is to achieve wide-bandwidth coherent combining of multiple VICTS antennas 100. The relatively large (>0.5 meters) baselines involved utilizes a true-time-delay (TTD) beamforming approach, in which the differential time-of-arrival of incoming wavefronts is estimated via the spatial relationship between antennas with respect to the direction of incidence, and then compensated with comparable, inverse delays in the post-antenna signal path, so as to properly align embedded baseband signals in time, and therefore over a wide range of frequencies. The system can use a high-resolution, TTD-based approach at RF to maximize bandwidth; indeed, this is the preferred approach for compatible lower-frequency VICTS antennas. However, a few practical considerations strongly encourage the use of a hybrid (TTD as well as phase-shift) beamforming approach.

More significantly, as typical VICTS antenna operating frequencies fall outside the direct-sampling capabilities of many cost-effective digitizers, an analog mixer/block downconverter is often used to mix down a block of RF frequencies to acceptable IF frequencies to relax the constraints on the digitizers. Any conventional mixer additively couples the phase of its inputs at its output; as one of the inputs to such a mixer is typically a "local oscillator" signal, which is a frequency-multiplied version of an externally-provided, high-stability, low-frequency (e.g., 10 or 50 MHz) reference oscillator, the phase of the mixer's output is directly additively coupled to that of the local oscillator signal. With common multiplication factors on the order of 1000×, the resulting output phase is extremely sensitive to the length and velocity factor of the cables carrying this reference oscillator signal. Indeed, the sensitivity approaches that of the RF signal.

It is not typical or cost-effective to constrain the length of the cables that carry the reference oscillator signal to the degree necessary to maintain phase coherency at the mixer outputs. Furthermore, temperature variations in these cables are sufficient to induce significant phase changes in the local oscillator (LO) signal over time. The net result of these effects is a random-offset pure phase shift of the signals at IF that that varies slowly over time and cannot be perfectly corrected purely by TTD at either RF or IF; indeed, any application of TTD to correct for this phase difference can instead result in degraded coherency of the baseband signals. In the digital domain, this phase shift manifests as a pure rotation of the digital signal in its complex representation, which requires a pure rotation, as opposed to TTD, to achieve optimal coherency.

Thus, in any post-analog-downmixing architecture, proper coherency is achieved by applying a pure phase compensation in addition to TTD. In an RF-sampled digital architecture, the phase shift is not strictly necessary even though downmixing is involved as long as the relevant digital resources are properly synchronized (such synchronization is essentially standardized in many applicable products). Then, as the entire downmixing process is a discrete-time, numerical process, the phase of the "LO signal can be directly controlled/observed in the digital domain, thereby removing any uncertainty in the output phase.

Additionally, as the VICTS antennas themselves will typically be the bandwidth bottleneck in the system, a phase-trimmed TTD approach does not necessarily decrease the available instantaneous bandwidth (IBW), and can significantly reduce the required digital resources.

The core beamforming pipeline is architected to take advantage of modern programmable "fabrics" which are generally categorized as "field-programmable gate arrays" or FPGAs. These contain not just programmable gates but also random-access memory blocks and even digital signal processing blocks, all interconnected by high-speed routing resources to form a larger mesh-like network. These architectures enable the massively-parallel processing and extremely high internal bandwidth needed to implement the beamforming pipeline. However, the resources of these fabrics are finite, so some of the related command/control components of the pipeline are more practically executed by a simple processing architecture like the advanced reduced instruction set computer machine (ARM) Cortex-R or Cortex-M platforms. As such, the overall beamforming pipeline is particularly well-suited to heterogeneous architectures like the Xilinx Radio Frequency System-on-Chip (RFSoC), which includes both an advanced programmable fabric as well as multiple ARM processor cores. Such architectures can process the signals and provide digital IF links to additional processing nodes and/or customer endpoints through embedded multi-gigabit high-speed digital transceivers, all on a single die. The RFSoC in particular is based on the Xilinx UltraScale+ platform and heterogeneous computer architecture, which combines high-performance programmable fabric and both realtime-profile and application-profile ARM processors, all of which are bridged by both fixed and reconfigurable high-speed interconnects. Moreover, the RFSoC embeds up to 16 radio frequency analog-to-digital converters (RF-ADCs) and 16 radio frequency digital-to-analog converters (RF-DACs), which significantly reduces power consumption and complexity vs external ADCs/DACs. All of these capabilities can be leveraged to achieve high-bandwidth, high-density digitization and sub-microsecond latency within each digital beamforming pipeline, while also enabling a scalable, mesh-like interconnect between processing nodes.

Referencing FIG. 10, a single beamforming pipeline 120 spans both the programmable fabric 107 and processor cores 108 as needed to maintain low latency and high throughput while making good use of the available fabric resources. In this regard, the beamforming pipeline uses 120 uses a subset of the resources of the programmable fabric 107 and the processor cores 108). On the fabric side, a single pipeline consists of stream mapping resources 121, 122, 124 (which map a set of logical input streams to a set of logical output streams by forwarding and/or copying a subset of the input streams to a subset of the output streams, and select which streams will be utilized in subsequent operations), digital beamforming elements 123, phase/TTD estimation elements 128, and a summation element 125. Each digital beamforming element 123 consists of a random-access true-time-delay element 126 and a high-resolution phase shift element 127 which together provide maximum beam agility through both positive and negative differential TTD and precise phase alignment. The TTD implementation can operate with multi-, single-, or sub-sample time resolution and can leverage the extensive (tens of megabits) and extremely high-bandwidth dedicated or/and ad-hoc (distributed) memory resources of modern programmable fabrics.

Due to the limited clock speed of even high-end programmable fabrics (on the order of hundreds of megahertz), vs the required sample rate (on the order of multiple gigasamples per second), all elements of the beamforming pipeline 120 operating on the primary data streams follow a super-sampling architecture, where a "packet" comprising multiple (tens) of time-domain samples is processed each fabric clock. The immediate post-digitization down-conversion/packetization and final pre-reconstruction depacketization/up-conversion of the relevant data streams is handled by dedicated infrastructure 105, 106 in the processing node. The down-conversion infrastructure 105 can perform real-to-complex mixing and decimation/lowpass filtering, which can be used simplify differential phase/TTD estimation and to isolate the band of interest while reducing the fabric clock required to process the data stream.

On the processor side 108, a hybrid (TTD and phase) beamformer 130 receives beam steering commands and actuates the individual TTD and phase components 126, 127 of the relevant digital beamforming elements 123 to steer the electronically-phased beam. Such a hybrid beamformer steers the beam primarily via time-delay, and finely trims the beam position with phase shift, so as to strike a balance between instantaneous bandwidth, beam steering precision, and resource utilization. The beamformer also commands the individual VICTS antennas 100 to steer the mechanically-phased beams. A diversity optimizer 131 receives beam steering commands and closed-loop differential phase/TTD feedback from the pipeline, and provides dynamically-optimized steering commands to the beamformer. The diversity optimizer is also capable of cross-correlating the received signals to optimize the applied TTD, though this capability is intended for initial array commissioning to compensate for time delays not related to array geometry, such as unmatched cable lengths. The processor cores 108 also hosts an automatic gain control algorithm which controls a digital step attenuator (DSA) for each input to keep the signal close to full-scale and to coarsely match the signals in amplitude. With the RFSoC in particular, the integrated on-die DSAs are leveraged to reduce cost and complexity.

Finally, the processor cores 108 hosts an array controller 132 which manages, with reference to FIG. 11, a series of virtual beams 140b, 141b, 142b, each of which can be commanded to point independently of the physical antenna resources 142a, 143b, and which can be extended via additional parameters such as desired beam geometry, multiplexing strategy, etc. Both physical antenna resources and other virtual resources (beams) can then be assigned to a given virtual beam, and their inclusion in a given virtual beam implicitly defines/constrains both their behavior and the required beamforming pipeline resources/configuration. This mechanism is used to construct a hierarchical set of behavioral constraints for the entire array, with each node in the hierarchy conveying explicit constraints, and with the hierarchical relationships conveying implicit constraints. This hierarchy of constraints is in turn used to dynamically construct and configure a digital beamforming network consisting of potentially multiple beamforming pipelines spanning potentially multiple beamforming nodes.

For example, suppose two virtual beams 141b, 142b are created and directed at two separate targets 144a, 144b; any resources assigned to the first beam 141a will be commanded to point at the first target 144a (or at a sub-target, for complex beam geometries), and the same for the second beam 142a. As multiple resources are assigned to a virtual beam, they will be multiplexed according to the configuration of that beam; if a coherent strategy is configured, the resources will be bonded (coherently combined). Other possible strategies include frequency multiplexing, pointing diversity (i.e., to create a wider, instead of narrower, combined beam), and signal-to-noise ratio (SNR)-driven oversubscription (i.e., prioritized oversubscription of an antenna resource, such that resources are automatically allocated/freed to meet the SNR requirements of the virtual beam). If a resource is transferred from one virtual beam to another, it will be commanded to point to that beam's target and will participate in that virtual beam's multiplexing strategy.

The inclusion of one processing node's antenna resource, physical or virtual, in another's virtual beam implicitly defines a routing constraint, and will cause the nodes to establish a digital IF stream through, in reference to FIG. 10, their stream mapping resources 121, 122, 124, and multi-gigabit transceivers 109, in order to move the necessary digitized signals between the participating nodes. That is, the signals from the antenna resources can be losslessly duplicated and routed both within a node and externally to other beamforming nodes. This architecture enables coherent bonding of beams, make-before-break beamforming, and instantaneous (nanoseconds) coherent handoff between beams. The lossless duplication of beams in particular enables multiple independent electronically-scanned beams to be simultaneously formed under the envelope of the mechanically scanned beams with no loss in power or increase in noise, for applications such as spatial pointing optimization.

Referring now to FIG. 12 illustrated is a flow chart depicting steps of an exemplary method 200 of coherently combining a plurality of VICTS antennas in accordance with the present invention. Variations to the illustrated method are possible and, therefore, the illustrated embodiment should not be considered the only manner of carrying out the techniques that are disclosed herein. Also, while FIG. 12 shows a specific order of executing functional logic blocks, the order of executing the blocks may be changed relative to the order shown and/or may be implemented in an object-oriented manner or a state-oriented manner. In addition, two or more blocks shown in succession may be executed concurrently or with partial concurrence. Certain blocks also may be omitted. The exemplary method may be carried out by executing code stored by an electronic device, for example. The code may be embodied as a set of logical instructions that may be executed by a processor, such as the processor cores 108. Therefore, the methods may be embodied as software in the form of a computer program that is stored on a computer readable medium, such as a memory.

Beginning at step 202, analog signals are received from two or more VICTS elements 12 of a VICTS antenna array 10, and at step 204 each of the plurality of signals is conditioned. In conditioning the received signals, they may be subjected to one or more of amplification, filtering (e.g., anti-aliasing), power limiting, and attenuation. Preferably, the received signal is subjected to all of the identified conditioning steps. Next at step 206, each of the received and conditioned analog signals is converted to digital form using, for example, and analog-to-digital converter, and the digitized signal is down converted. In down converting the signal, a frequency-shift is applied such that a bandwidth of frequencies is moved to a lower center frequency.

At step 208, certain desired digitized signals are selected, and a phase shift and TTD function are applied to the selected digitized signals. Selection of the signals can be a function of which VICTS antenna elements 12 are optimal for the beam (e.g., which antenna elements 12 are facing the right direction to provide optimal signal reception, e.g., some antenna elements 12 of the array 10 may be pointing in a direction such that they receive a stronger signal than other antenna elements 12 of the array 10. Selection can also be based on the number of beams being formed. For example, one beam may be focused on a first signal, and another beam may be focused on a second, different signal. Selection of the signals then would be based on the signals of interest for that beam. Thus, the signals of interest for a first beam may be different than the signals of interest for a second (different) beam. In other words, the selection of signals can be based on the signal of interest for the respective beam.

Moving to steps 210-214, these steps provide a closed loop feedback methodology for optimizing pointing of the main beam. Steps 210-214 may be executed on a continuous basis independent (asynchronously) of steps 202-208 and 216-224, or they may be executed in parallel (synchronously) with step 208.

With reference to step 210, the hybrid beamformer 130 computes the expected TTD and phase based on expected geometric locations of the VICTS elements 12 (i.e., the physical position and orientation of the elements) and the geometry of the incoming wave (beam) of interest. The expected phase and TTD then are optimized in steps 212 and 214 as discussed below.

At step 212, the phase and TTD for each selected (desired) signal is estimated relative to a selected reference signal (e.g., a signal from another antenna element 12). To estimate the TTD, each selected received signal can be cross-correlated to find a time shift that aligns the selected received analog signals The time shift that provides the "best alignment" for each of the selected received signals is the estimated (optimized) TTD. With respect to the phase, since the digital pipeline operates on complex (in the mathematical sense) samples, the estimated (optimized) phase can be obtained from the phase difference between a reference signal (i.e., a signal from another antenna element 12) and each selected received analog signal. Next at step 214, the expected TTD and phase (as computed by the hybrid beamformer 130) for each selected (desired) signal are combined with the estimated TTD and phase to optimize the coherency of the signal. The optimized TTD and phase then are used in step 208 and applied to the selected (desired) digitized signals.

Moving to step 216, the selected (desired) TTD/phase shifted signals are summed together to provide a coherently-combined (desired) digitized signal from the plurality of VICTS elements 12 of the array 10. This coherently-combined signal then may be communicated to endpoints either in digital or analog form. If the signal is to be provided to a digital endpoint, no further processing is needed and the coherently-combined digitized signal may be communicated to selected digital endpoints using, for example, a digital modem 110b.

If the signal is to be communicated in analog form, then the digitized signal is converted to an analog signal at steps 220-224. More particularly, at step 220 the desired digitized signal is selected, up converted and reconstructed as an analog signal. Then at step 222 the reconstructed analog signal is conditioned (filtered) and at step 224 the reconstructed and filtered analog signal is communicated to analog endpoints using, for example, analog modem 110a.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

The invention claimed is:

1. A variable inclination continuous transverse stub (VICTS) antenna system, comprising:
   a support structure;
   at least two VICTS antenna elements attached to the support structure, each VICTS antenna element of the at least two VICTS antenna elements comprising a first plate including a lattice of continuous radiating stubs and a second plate spaced apart from the first plate; and
   a controller operatively coupled to the at least two VICTS antenna elements, the controller configured to coherently combine signals received from each of the at least two VICTS antenna elements.

2. The VICTS antenna system according to claim 1, wherein the controller is operative to receive an analog signal from each of the at least two VICTS antenna elements and condition each of the received analog signals.

3. The VICTS antenna system according to claim 1, wherein the controller is configured to select a signal of interest from each signal received from the at least two VICTS antenna elements, and apply a phase shift and true time delay (TTD) to the each of the selected signal of interest.

4. The VICTS antenna system according to claim 3, wherein the controller is configured to use an expected phase shift and an expected TTD based on an expected geometric configuration of the VICTS antenna system and on expected geometric characteristics of the selected received analog signal.

5. The VICTS antenna system according to claim 3, wherein the controller is configured to sum each of the selected, phase shifted and TTD signals to form a coherently-combined signal.

6. The VICTS antenna system according to claim 1, wherein a first subset of the at least two VICTS antenna elements form a first antenna group, and a second subset of the at least two VICTS antenna elements form a second antenna group, wherein the controller is operative to communicate over a first frequency band using the first antenna group, and to communicate over a second frequency band using the second antenna group.

7. The VICTS antenna system according to claim 6, wherein the first frequency band is the X-band and the second frequency band is the S-band.

8. The VICTS antenna system according to claim 1, wherein the controller is operative to electronically steer the at least two VICTS antenna elements.

9. The VICTS antenna system according to claim 1, wherein the support structure comprises a flat surface.

10. The VICTS antenna system according to claim 1, wherein the support structure comprises a roof or external wall of a building.

11. The VICTS antenna system according to claim 1, wherein the support structure comprises a hemispherical shape.

12. The VICTS antenna system according to claim 1, wherein the controller comprises at least one of a receive antenna controller or a transmit antenna controller.

13. The VICTS antenna system according to claim 12, wherein the controller comprises a receive antenna controller, further comprising a receive antenna beam former communicatively coupled to the receive antenna controller, the receive antenna beam former communicatively coupled to each of the at least two VICTS antenna elements.

14. The VICTS antenna system according to claim 12, further comprising at least two phase shifting elements, wherein a respective one of the at least two phase shifting elements is communicatively arranged between the receive antenna beam former and a respective one of the at least two VICTS antenna elements, each of the plurality of phase shifting elements communicatively coupled to the receive antenna controller.

15. The VICTS antenna system according to claim 13 wherein the beam former comprises both radio frequency (RF) and digital elements.

16. The VICTS antenna system according to claim 1, wherein the second plate comprises one or more line sources emanating into a region between the first plate and the second plate.

17. The VICTS antenna system according to claim 1, wherein each of the plurality of VICTS antenna elements are separate and distinct from one another.

18. The VICTS antenna system according to claim 1, wherein the at least two VICTS antenna elements comprise a first VICTS antenna element and a second VICTS antenna element, and wherein the first plate and the second plate of the first VICTS antenna element are separate and distinct from the first plate and the second plate of the second VICTS antenna element.

19. A variable inclination continuous transverse stub (VICTS) antenna system, comprising:

a support structure;

at least two VICTS antenna elements attached to the support structure; and a controller operatively coupled to the at least two VICTS antenna elements, the controller configured to coherently combine signals received from each of the at least two VICTS antenna elements, wherein the controller is configured to select a signal of interest from each signal received from the at least two VICTS antenna elements, and apply a phase shift and true time delay (TTD) to the each of the selected signal of interest, wherein the controller is configured to use an expected phase shift and an expected TTD based on an expected geometric configuration of the VICTS antenna system and on expected geometric characteristics of the selected received analog signal, and, wherein the controller is configured to i) optimize the expected phase shift for each selected received signal by obtaining a phase difference between a reference signal and each selected received signal, and ii) and optimize the expected TTD for each selected signal by cross-correlating each selected received signal to find a time shift that aligns the selected received signals.

20. A method for obtaining a radio frequency (RF) signal using a variable inclination continuous transverse stub (VICTS) antenna system that includes at least two VICTS antenna elements attached to a support structure, comprising:

receiving an analog signal from each of the at least two VICTS antenna elements, each VICTS antenna element of the at least two VICTS antenna elements comprising a first plate including a lattice of continuous radiating stubs and a second plate spaced apart from the first plate; and coherently combining each of the received analog signals.

21. The method according to claim 20, further comprising conditioning each of the received analog signals.

22. The method according to claim 21, wherein conditioning comprises at least one of amplifying, filtering, power limiting, and attenuating.

23. The method according to claim 20, further comprising selecting a signal of interest from each analog signal received from the at least two VICTS antenna elements, and applying a phase shift and true time delay (TTD) to each of the selected signals.

24. The method according to claim 23, wherein applying the phase shift and TTD includes using an initial phase shift and an initial TTD based on an expected geometric configuration of the VICTS antenna system and on expected geometric characteristics of the selected received analog signal.

25. The method according to claim 24, further comprising i) optimizing an expected phase shift for each selected received signal by obtaining a phase difference between a reference signal and each selected received signal, and ii) and optimizing an expected TTD for each selected received signal by cross-correlating each selected received signal to find a time shift that aligns the selected received signals.

26. The method according to claim 23, further comprising summing each of the selected, phase shifted and TTD signals to form the coherently-combined signal, and communicating the coherently-combined signal to an end point.

* * * * *